(12) United States Patent
Maeda

(10) Patent No.: US 10,953,699 B2
(45) Date of Patent: Mar. 23, 2021

(54) TIRE FOR RUNNING ON ROUGH TERRAIN

(71) Applicant: Sumitomo Rubber Industries, Ltd., Kobe (JP)

(72) Inventor: Yohei Maeda, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 274 days.

(21) Appl. No.: 15/802,810

(22) Filed: Nov. 3, 2017

(65) Prior Publication Data

US 2018/0147892 A1    May 31, 2018

(30) Foreign Application Priority Data

Nov. 25, 2016   (JP) .............................. JP2016-229220

(51) Int. Cl.
*B60C 11/03*    (2006.01)
*B60C 11/11*    (2006.01)

(52) U.S. Cl.
CPC ........... *B60C 11/11* (2013.01); *B60C 11/0302* (2013.01); *B60C 11/0311* (2013.01); *B60C 2011/0313* (2013.01); *B60C 2200/14* (2013.01)

(58) Field of Classification Search
CPC ............. B60C 2011/0374; B60C 11/11; B60C 11/0302; B60C 2011/0313; B60C 2200/10
See application file for complete search history.

(56) References Cited

U.S. PATENT DOCUMENTS

| | | | | |
|---|---|---|---|---|
| 2015/0165826 A1* | 6/2015 | Oba | .................... | B60C 11/0302 152/209.11 |
| 2016/0075186 A1* | 3/2016 | Tamura | .................. | B60C 11/11 152/209.11 |

FOREIGN PATENT DOCUMENTS

| | | | |
|---|---|---|---|
| EP | 2 204 295 A1 | 7/2010 | |
| EP | 2 998 129 A1 | 3/2016 | |
| JP | 62004611 A | * 1/1987 | |
| JP | 02189206 A | * 7/1990 | |
| JP | 2005-193784 A | 7/2005 | |
| JP | 2015134578 A | * 7/2015 | .............. B60C 11/11 |
| JP | 2016-60347 A | 4/2016 | |

OTHER PUBLICATIONS

Extended European Search Report dated May 14, 2018, in European Patent Application No. 17202003.4.

* cited by examiner

*Primary Examiner* — Robert C Dye
*Assistant Examiner* — Farah Taufiq
(74) *Attorney, Agent, or Firm* — Birch, Stewart, Kolasch & Birch, LLP

(57) ABSTRACT

A tire for running on rough terrain comprises a tread portion 2 bound with an intended tire rotational direction. The tread portion 2 comprises a row of crown blocks 10 and rows of middle blocks 11. The crown blocks 10 and the middle blocks 11 each has an axially-elongated shape. A crown front edge 15 of each of the crown block 10 comprises a most concave portion 18 positioned at the most toe-side thereof in the tire rotational direction and a pair of inclined edges 20 extending from the most concave portion 18 toward axially both sides thereof and toward the heel-side in the tire rotational direction. The inclined edges 20 are each inclined at an angle from 10 to 45 degrees with respect to the tire axial direction. A middle front edge 21 of each of the middle blocks 11 extends axially outwardly and is inclined to the heel-side.

19 Claims, 6 Drawing Sheets

TIRE FOR RUNNING ON ROUGH TERRAIN

TECHNICAL FIELD

The present invention relates to a tire for running on rough terrain capable of exerting large traction on muddy roads.

BACKGROUND ART

For example, Japanese Unexamined Patent Application Publication No. 2016-60347 (Patent Literature 1) has proposed a tire for running on rough terrain provided with axially-long crown blocks and middle blocks in order to obtain large traction.

However, in the tire disclosed in Patent Literature 1, mud scraped by crown blocks when they contact the ground easily moves in lateral directions during running on muddy roads, therefore, there is room for further improvement of traction.

SUMMARY OF THE INVENTION

The present invention was made in view of the above, and a primary object thereof is to provide a tire for running on rough terrain capable of exerting large traction on muddy roads.

In one aspect of the present invention, a tire comprises a tread portion bound with an intended tire rotational direction and comprising a row of crown blocks arranged on a tire equator and a pair of rows of middle blocks arranged in a tire circumferential direction on both sides of the row of the crown blocks, wherein each of the crown blocks and the middle blocks has an axially-elongated shape in which a length thereof in a tire axial direction is longer than a length thereof in the tire circumferential direction, a ground contacting surface of each of the crown blocks has a crown front edge positioned on a heel-side in the tire rotational direction, the crown front edge comprises a most concave portion positioned at the most toe-side thereof in the tire rotational direction and a pair of inclined edges extending from the most concave portion toward both sides thereof in the tire axial direction and toward the heel-side in the tire rotational direction, an inclination angle of each of the inclined edges is in a range of from 10 to 45 degrees with respect to the tire axial direction, a ground contacting surface of each of the middle blocks has a middle front edge positioned on the heel-side in the tire rotational direction, and the middle front edge extends axially outwardly and is inclined to the heel-side.

In another aspect of the invention, it is preferred that the middle front edge is inclined at an angle in a range of from 10 to 45 degrees with respect to the tire axial direction.

In another aspect of the invention, it is preferred that a pair of the crown block and the middle block adjacent to each other in the tire circumferential direction are arranged so that an imaginary straight line obtained by connecting a centroid of the ground contacting surface of the crown block and a centroid of the ground contacting surface of the middle block is inclined at an angle in a range of from 20 to 45 degrees with respect to the tire axial direction.

In another aspect of the invention, it is preferred that in a pair of the crown block and the middle block adjacent to each other in the tire circumferential direction, a gap in the tire axial direction between the crown block and the middle block is in a range of from 0.05 to 0.10 times a tread development width, and a gap in the tire circumferential direction between the crown block and the middle block is in a range of from 0.50 to 1.00 times the gap in the tire axial direction.

In another aspect of the invention, it is preferred that a width in the tire axial direction of the ground contacting surface of each of the crown blocks is in a range of from 0.25 to 0.35 times the tread development width, and a width in the tire axial direction of the ground contacting surface of each of the middle blocks is in a range of from 0.10 to 0.15 times the tread development width.

In another aspect of the invention, it is preferred that the ground contacting surface of each of the middle blocks comprises a substantially rectangular block main body and a convex portion protruding toward the toe-side from the block main body.

In another aspect of the invention, it is preferred that the convex portion is provided axially outside a center position in the tire axial direction of the ground contacting surface of the middle block.

In another aspect of the invention, it is preferred that the middle front edge is concave toward the toe-side.

In another aspect of the invention, it is preferred that the ground contacting surface of each of the middle blocks has a middle rear edge, and the middle rear edge is concave toward the heel-side.

DESCRIPTION OF THE PREFERRED EMBODIMENT

An embodiment of the present invention will now be described in conjunction with accompanying drawings.

Figure 1:
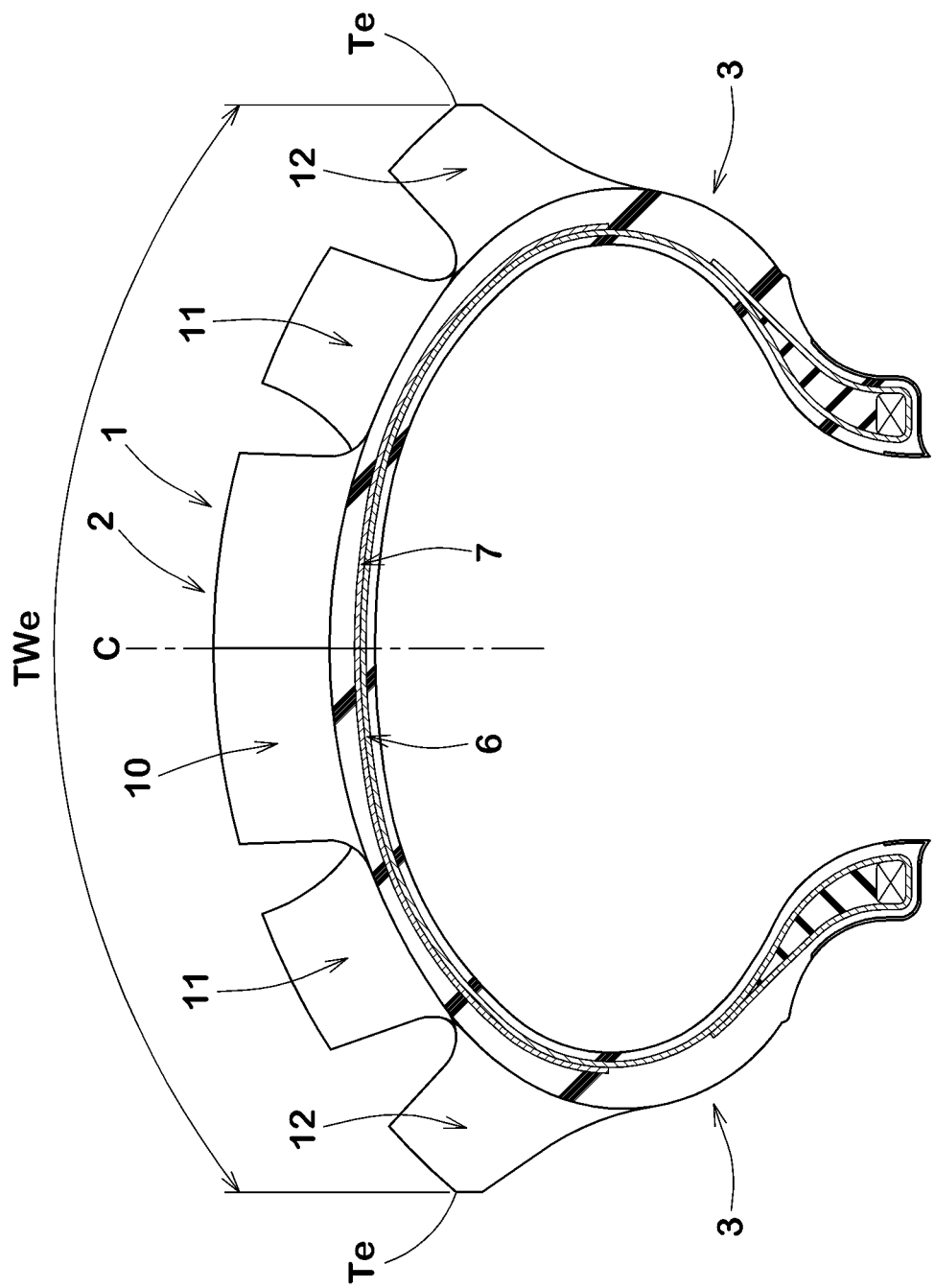
FIG. 1 is a lateral cross-sectional view of a tire for running on rough terrain according to one embodiment of the present invention.
Figure 2:
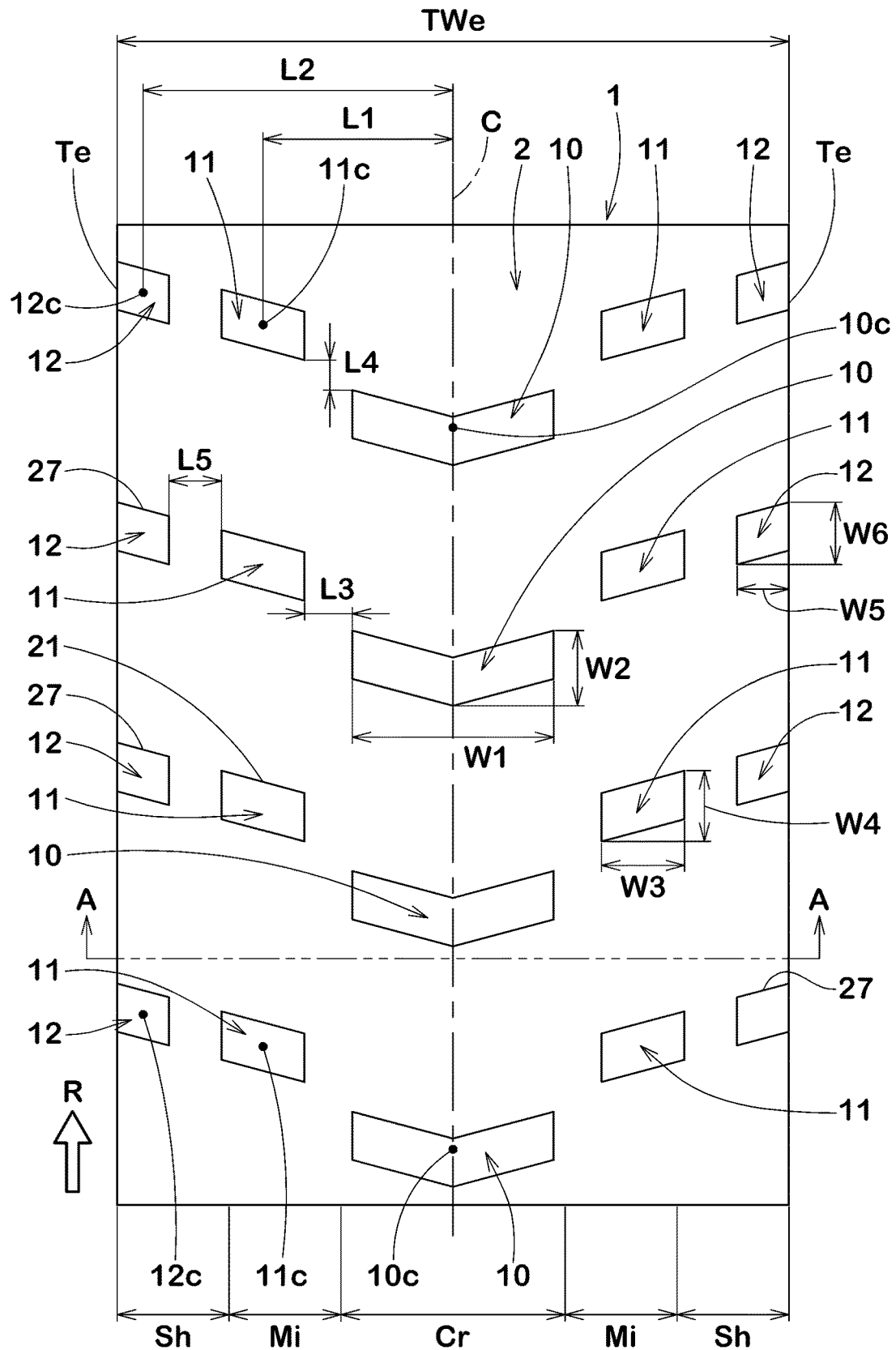
FIG. 2 is a development view showing a tread pattern of a tread portion of FIG. 1.

FIG. 1 is a lateral cross-sectional view of a tire for running on rough terrain (hereinafter may be simply referred to as "tire") 1 according to an embodiment of the present invention in a standard state. FIG. 2 is a development view of a tread portion 2 of the tire 1 showing a tread pattern thereof. FIG. 1 is a cross-sectional view taken along A-A line of FIG. 2.

The "standard state" is a state in which the tire 1 is mounted on a standard rim (not shown), inflated to a standard pressure, and loaded with no tire load. In this specification, dimensions and the like of various parts of the tire are values measured in the standard state unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tire 1 in this embodiment is a tire for a motorcycle for running on rough terrain, and is used, for example, for motocross competition. Thereby, in the lateral cross-section of the tread portion 2 of the tire 1 in this embodiment, an outer surface thereof is curved in an arc shape protruding outwardly in a tire radial direction. However, the tire of the present invention is not limited to a tire for a motorcycle, but may be used for a three-wheel buggy or a 4WD-car, for example.

The tire 1 in this embodiment is provided with, for example, a carcass 6 and a belt layer 7. Known configurations are appropriately applied to these.

As shown in FIG. 2, the tread portion 2 has a directional pattern bound with an intended rotational direction (R). The rotational direction (R) is indicated by a letter or a symbol on at least one of the sidewall portions 3 (shown in FIG. 1), for example.

The tread portion 2 is divided into a crown region (Cr), a pair of middle regions (Mi), and a pair of shoulder regions (Sh), for example.

The crown region (Cr) is a region having a width of ⅓ of a tread development width (TWe) with a tire equator (C) in a center thereof.

The shoulder regions (sh) are regions each having a width of ⅙ of the tread development width (TWe) and extending from each of tread edges (Te) toward the tire equator (C). Each of the middle regions (Mi) is a region between the crown region (Cr) and each of the shoulder regions (sh).

The tread development width (TWe) is a distance in a tire axial direction between tread edges (Te) when the tread portion 2 is developed into a plane. The "tread edges (Te)" means axially outermost edges of blocks arranged axially outermost among the blocks provided in the tread portion 2.

The tread portion 2 is provided with a row of crown blocks 10 arranged along the tire equator (C), a pair of rows of middle blocks 11 arranged in a tire circumferential direction on both sides in the tire axial direction of the row of the crown blocks 10, and a pair of rows of shoulder blocks 12 each arranged in the tire circumferential direction on an axially outer side of the corresponding row of the middle blocks 11.

In each of the crown blocks 10, for example, the entire block is provided in the crown region (Cr) and at least a part thereof extends across the tire equator (C). In each of the crown blocks 10, for example, a center portion thereof in the tire axial direction is located on the tire equator (C). As a preferred embodiment, each of the crown blocks 10 in this embodiment has a ground contacting surface that is line symmetrical with respect to the tire equator (C) with a centroid ($10c$) of the ground contacting surface located on the tire equator (C).

In each of the middle blocks 11, for example, a centroid ($11c$) of a ground contacting surface thereof is located within the middle regions (Mi). A part of each of the middle blocks 11 in this embodiment extends across a boundary (not shown) between one of the middle regions (Mi) and its adjacent one of the shoulder regions (sh). The centroids ($11c$) of the ground contacting surfaces of the middle blocks 11 in this embodiment are provided, for example, in regions axially outside the center positions in the tire axial direction of the middle regions (Mi). More specifically, a distance L1 in the tire axial direction (that is, a distance along the outer surface of the tread portion 2, the same applies below) between the centroid ($11c$) of the ground contacting surface of each of the middle blocks 11 and the tire equator (C) is, for example, in a range of from 0.25 to 0.35 times the tread development width (TWe).

In each of the shoulder blocks 12, for example, a centroid ($12c$) of a ground contacting surface thereof is located within the shoulder regions (sh). The centroids ($12c$) of the ground contacting surfaces of the shoulder blocks 12 in this embodiment are provided, for example, in regions axially outside the center positions in the tire axial direction of the shoulder regions (sh). More specifically, a distance L2 in the tire axial direction between the centroid ($12c$) of the ground contacting surface of each of the shoulder blocks 12 and the tire equator (C) is, for example, in a range of from 0.40 to 0.48 times the tread development width (TWe).

Each of the crown blocks 10 and the middle blocks 11 has an axially-elongated shape in which a length thereof in the tire axial direction is larger than a length thereof in the tire circumferential direction. The crown blocks 10 and the middle blocks 11 configured as such can exert large traction upon shearing mud on a road surface during running on a muddy road.

It is preferred that a ratio W2/W1 of a length W2 in the tire circumferential direction and a width W1 in the tire axial direction of the ground contacting surface of each of the crown blocks 10 is in a range of from 0.25 to 0.45, for example. Further, it is preferred that the width W1 in the tire axial direction of the ground contacting surface of each of the crown blocks 10 is in a range of from 0.25 to 0.35 times the tread development width (TWe), for example.

The crown blocks 10 configured as such have sufficient rigidity in the tire circumferential direction, therefore, it is possible that large traction is exerted under various road surface conditions.

It is preferred that a ratio W4/W3 of a length W4 in the tire circumferential direction and a width W3 in the tire axial direction of the ground contacting surface of each of the middle blocks 11 is in a range of from 0.50 to 0.90, for example. Further, it is preferred that the width W3 in the tire axial direction of the ground contacting surface of each of the middle blocks 11 is smaller than ½ of the width W1 of the crown block 10, for example. More specifically, it is preferred that the W3 is in a range of from 0.10 to 0.15 times the tread development width (TWe).

Figure 3:
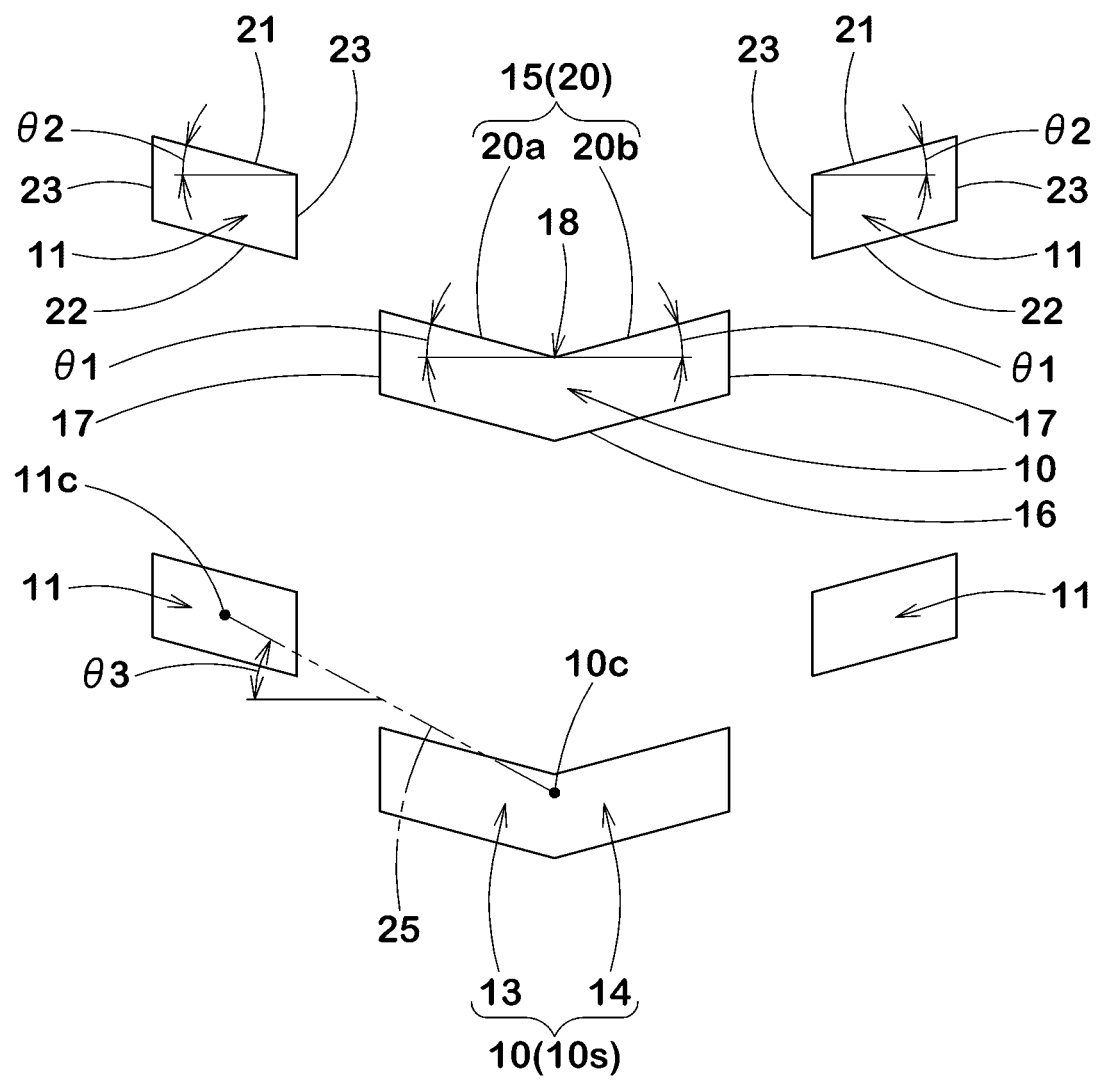
FIG. 3 is an enlarged partial view of crown blocks and middle blocks.

FIG. 3 shows an enlarged partial view of the crown blocks 10 and the middle blocks 11. As shown in FIG. 3, a ground contacting surface ($10s$) of each of the crown blocks 10 comprises, for example, a first surface 13 disposed on one side of a center position of the ground contacting surface ($10s$) in the tire axial direction and a second surface 14 disposed on the other side of the center position and connected with the first surface 13. Each of the first surface 13 and the second surface 14 is formed in an axially-elongated shape in which a width thereof in the tire circumferential direction is constant in a longitudinal direction of the ground contacting surface in this embodiment. Further, each of the first surface 13 and the second surface 14 is, for example, formed in a rectangular shape, and formed in a parallelogram shape in this embodiment. As a more preferred embodiment, the first surface 13 and the second surface 14 are configured in line symmetry. However, the ground contacting surfaces of the crown blocks 10 are not limited to such a configuration.

The ground contacting surface of each of the crown blocks 10 includes a crown front edge 15 positioned on a heel-side in the rotational direction (R) (hereinafter may be simply referred to as "heel-side") and a crown rear edge 16 positioned on a toe-side in the rotational direction (R) (hereinafter, may be simply referred to as "toe-side"), and a pair of crown side edges 17 extending therebetween.

The crown front edge 15 is concave toward the toe-side and includes a most concave portion 18 positioned at the most toe-side. The most concave portion 18 in this embodiment is provided, for example, at the center position in the tire axial direction of the block. However, the crown front edge is not limited to such a configuration, and the most concave portion 18 may be provided, for example, at a position different from the center position.

The crown front edge 15 includes a pair of inclined edges 20 each extending from the most concave portion 18 positioned at the most toe-side toward both sides of the most concave portion 18 in the tire axial direction and toward the heel-side. The inclined edges 20 include an inclined edge (20a) on one side and an inclined edge (20b) on the other side in the tire axial direction, and they are inclined in opposite directions to each other.

Each of the inclined edges (20a) and (20b) in this embodiment extends straight from the most concave portion 18 to respective ends in the tire axial direction of the crown front edge 15, for example. That is, the entire crown front edge 15 is composed of a pair of the inclined edges 20. Thereby, the pair of inclined edges 20 is configured, for example, in a v-shape that is concave toward the toe-side.

The inclined edge (20a) on one side and the inclined edge (20b) on the other side in this embodiment are formed line-symmetrically. However, they are not limited to such a configuration and the inclined edge (20a) and the inclined edge (20b) may have shapes and lengths different from each other.

With the inclined edges 20 configured as such, each of the crown blocks 10 has block walls extending radially inwardly from each of the inclined edges 20 on the heel-side. The block walls disposed on the heel-side include two surfaces inclined in opposite directions to each other on both sides of the most concave portion 18, and are concave toward the toe-side.

An angle θ1 of each of the inclined edges (20a) and (20b) with respect to the tire axial direction is in a range of from 10 to 45 degrees. The crown blocks 10 configured as such can scrape mud toward the center of the block and then can shear it by the inclined edges 20 during running on rough terrain. Thereby, mud does not escape in the left and right sides of the inclined edges, therefore, larger traction can be expected.

The angle θ1 is preferably not larger than 30 degrees, more preferably not larger than 20 degrees. Thereby, it is possible that large traction is obtained even on a relatively hard road surface.

The crown rear edge 16 extends along the crown front edge 15, for example. Thereby, the crown rear edge 16 is configured in a V-shape convex toward the toe-side. As a more preferred embodiment, the crown rear edge 16 and the crown front edge 15 extend in parallel with each other. Thereby, each of the crown blocks 10 extends in the tire axial direction with a constant width, therefore, partial damage of the blocks during running is suppressed.

The crown side edges 17 are disposed on both sides in the tire axial direction of the crown block 10 and extend in the tire circumferential direction between the crown front edge 15 and the crown rear edge 16. The crown side edges 17 in this embodiment extend straight in the tire circumferential direction. The crown side edges 17 configured as such is helpful for shearing mud in the tire axial direction, therefore, it is possible that cornering performance on rough terrain is improved.

For example, a plurality of the middle blocks 11 is provided in the tire circumferential direction at same pitches as the crown blocks 10.

The ground contacting surface of each of the middle blocks 11 is, for example, formed in a rectangular shape, and in this embodiment, a width thereof in the tire circumferential direction is constant in a lateral direction of the block. As a preferred embodiment, the ground contacting surface of each of the middle blocks 11 in this embodiment is configured in a parallelogram shape.

The ground contacting surface of each of the middle blocks 11 includes a middle front edge 21 positioned on the heel-side, a middle rear edge 22 positioned on the toe-side, and a pair of middle side edges 23 extending between them.

The middle front edge 21 extends axially outwardly and is inclined to the heel-side. Thereby, each of the middle blocks 11 has a block wall extending radially inwardly from the middle front edge 21 on the heel-side. The block wall on the heel-side is inclined in the same direction as the middle front edge 21.

The middle blocks 11 configured as such guide mud and the like to sides of the crown blocks 10 by the middle front edges 21 during running on muddy roads. Thereby, it is possible that the crown blocks 10 shear more mud, therefore, larger traction is obtained.

The middle front edge 21 in this embodiment extends straight in its entirety, for example. Thereby, it is possible that more mud is guided toward the crown blocks 10.

It is preferred that an angle θ2 of the middle front edge 21 with respect to the tire axial direction is in a range of from 10 to 45 degrees, for example. In order to exert large traction under various road surface conditions, the angle θ2 is preferably not greater than 30 degrees, more preferably not greater than 20 degrees.

The middle rear edge 22 is inclined to the same direction as the middle front edge 21, for example. It is preferred that the middle rear edge 22 extends along the middle front edge 21. As a more preferred embodiment, the middle rear edge 22 in its entirety in this embodiment extends in parallel with the middle front edge 21.

The middle side edges 23 are arranged on both sides in the tire axial direction of each of the middle blocks 11. Each of the middle side edges 23 extends in the tire circumferential direction between the middle front edge 21 and the middle rear edge 22, and extends straight along the tire circumferential direction in this embodiment.

The middle side edges 23 configured as such are helpful for shearing mud in the tire axial direction, therefore, it is possible that the cornering performance on rough terrain is improved.

In a pair of the crown block 10 and the middle block 11 adjacent in the tire circumferential direction, an imaginary straight line 25 obtained by connecting the centroid (10c) of the ground contacting surface of the crown block 10 and the centroid (11c) of the ground contacting surface of the middle block 11 is inclined in the same direction as the middle front edge 21. It is preferred that the pair of the crown block 10 and the middle block 11 is arranged so that the imaginary straight line 25 is inclined at an angle θ3 in a range of from 20 to 45 degrees with respect to the tire axial direction. By such arrangement of the blocks, it is possible that a lot of mud is guided toward the crown blocks 10, therefore, excellent traction performance is obtained.

In order to exert large traction under various road surface conditions, the angle θ3 is preferably not more than 40 degrees, more preferably not more than 30 degrees.

As shown in FIG. 2, the crown block 10 and the middle block 11 are arranged so as to have a gap L3 in tire axial direction between the ground contacting surfaces thereof, for example. In other words, an area obtained by projecting the ground contacting surface of the crown block 10 in the tire circumferential direction does not overlap the ground contacting surface of the middle block 11. It is preferred that the gap L3 is in a range of from 0.05 to 0.10 times the tread development width (TWe), for example. By such arrangement of the crown blocks 10 and the middle blocks 11, it is possible that clogging of mud between the blocks is suppressed.

The centroids of the ground contacting surfaces of the crown block 10 and the middle block 11 in this embodiment are misaligned in the tire circumferential direction, for example. As a preferred embodiment, the crown block 10 and the middle block 11 in this embodiment are misaligned in their entirety in the tire circumferential direction. That is, the crown block 10 and the middle block 11 are arranged so as to have a gap L4 in the tire circumferential direction between the ground contacting surfaces thereof, and an area obtained by projecting the ground contacting surface of the crown block 10 along the tire axial direction does not overlap the ground contacting surface of the middle block 11.

The gap L4 is preferably not smaller than 0.50 times the above described gap L3 in the tire axial direction, more preferably not smaller than 0.65 times the gap L3, and preferably not more than 1.00 times the gap L3, more preferably not more than 0.85 times the gap L3. By such arrangement of the crown blocks 10 and the middle blocks 11, it is possible that the middle blocks 11 guide a lot of mud toward the crown blocks 10, therefore, it is possible that clogging of mud is suppressed.

For example, a plurality of the shoulder blocks 12 is provided in the tire circumferential direction at the same pitches as the middle blocks 11.

The ground contacting surface of each of the shoulder blocks 12 is formed in a rectangular shape, for example, and in this embodiment, a length thereof in the tire circumferential direction is constant in the lateral direction of the block. As a preferred embodiment, the ground contacting surface of each of the shoulder blocks 12 in this embodiment is configured in a parallelogram shape.

It is preferred that a ratio W6/W5 of a length W6 in the tire circumferential direction and a length W5 in the tire axial direction of the ground contacting surface of each of the shoulder blocks 12 is in a range of from 0.90 to 1.30, for example. Further, it is preferred that the length W5 in the tire axial direction of the ground contacting surface of the shoulder block 12 is smaller than the width W3 in the tire axial direction of the ground contacting surface of the middle block 11, for example, and specifically, it is preferred that the length W5 is in a range of from 0.05 to 0.10 times the tread development width (TWe).

The ground contacting surface of each of the shoulder blocks 12 has a shoulder front edge 27 located on the heel-side thereof. The shoulder front edge 27 is inclined in the same direction as the middle front edge 21, for example. It is preferred that the shoulder front edge 27 is inclined at the same angle as the middle front edge 21 with respect to the tire axial direction. As a further preferred embodiment, the shoulder front edge 27 in this embodiment is provided at a position where the middle front edge 21 is extended in its longitudinal direction. Thereby, it is possible that the shoulder blocks 12 and the middle blocks 11 shear mud together as one body, therefore, excellent traction performance is obtained.

The middle block 11 and the shoulder block 12 are arranged so as to have a gap L5 in tire axial direction between the ground contacting surfaces thereof, for example. In other words, an area obtained by projecting the ground contacting surface of the middle block 11 in the tire circumferential direction does not overlap the ground contacting surface of the shoulder block 12. It is preferred that the gap L5 is in a range of from 0.05 to 0.10 times the tread development width (TWe), for example. By such arrangement of the middle blocks 11 and the shoulder blocks 12, it is possible that clogging of mud is suppressed while exerting the above described effects.

A projection area in the tire axial direction of the ground contacting surface of the middle block 11 in this embodiment overlaps the ground contacting surface of the shoulder block 12. On the other hand, the centroid ($11c$) of the ground contacting surface of the middle block 11 and the centroid ($12c$) of the ground contacting surface of the shoulder block 12 are misaligned in the tire circumferential direction. Specifically, the centroid ($12c$) of the shoulder block 12 is positioned on the heel-side of the centroid ($11c$) of the middle block 11. Thereby, the shoulder blocks 12 guide mud toward the middle blocks 11, therefore, it is possible that the traction performance during cornering is improved.

Figure 4:
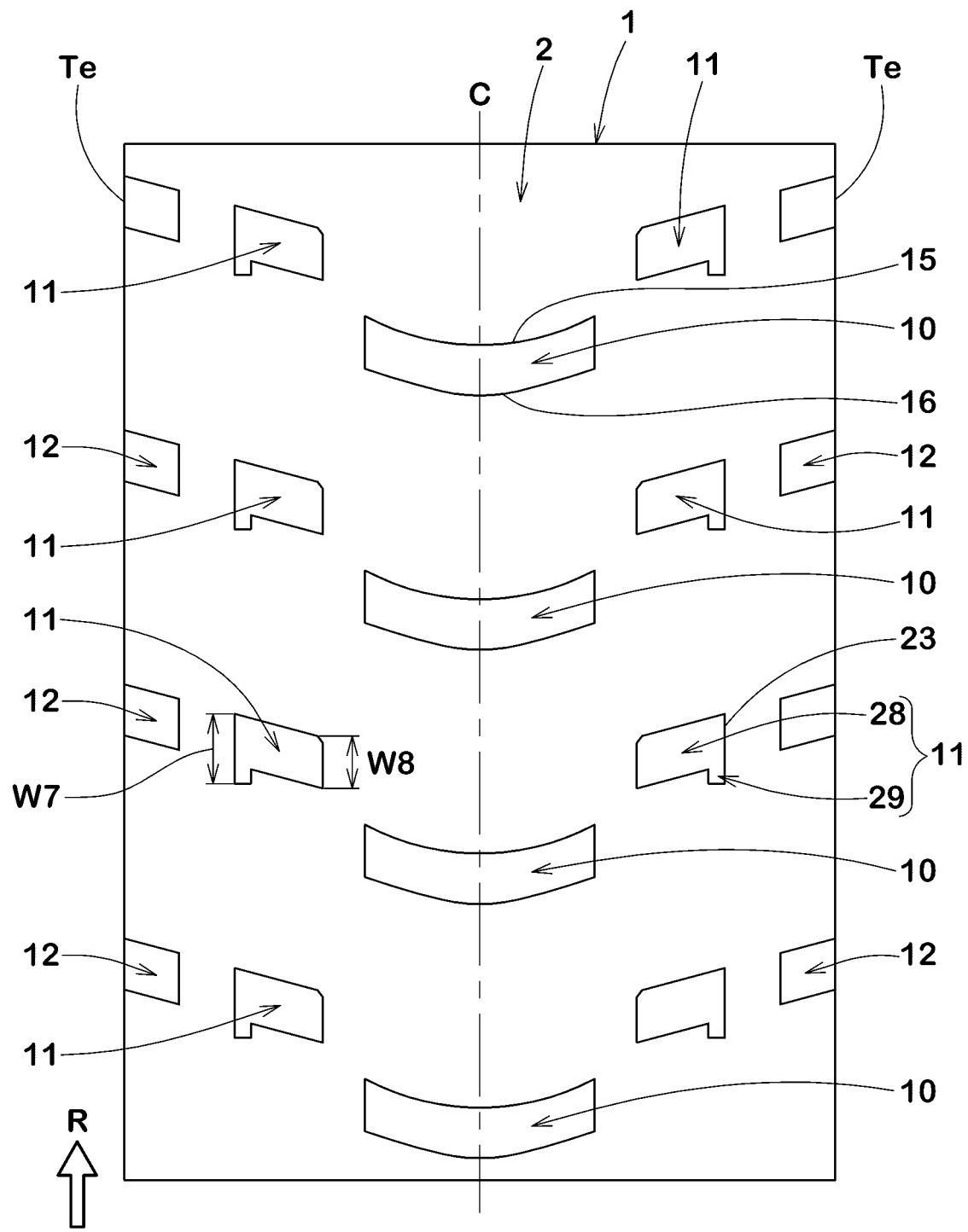
FIG. 4 is a development view of the tread portion of a tire for running on rough terrain according to second embodiment of the present invention.
Figure 5:
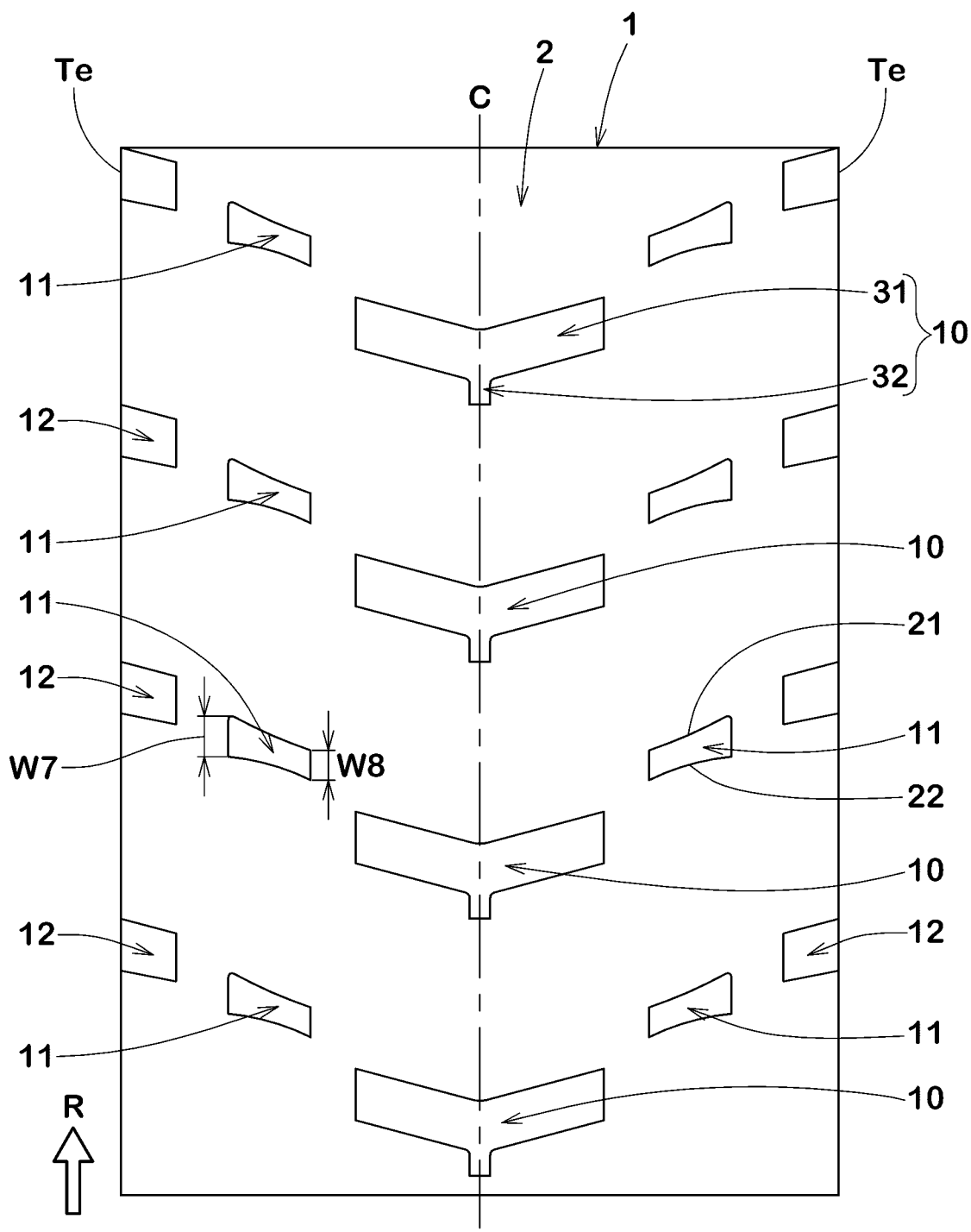
FIG. 5 is a development view of the tread portion of a tire for running on rough terrain according to third embodiment of the present invention.

FIG. 4 shows a development view of the tread portion 2 according to second embodiment of the present invention and FIG. 5 shows a development view of the tread portion 2 according to third embodiment of the present invention. The embodiments shown in FIGS. 4 and 5 have the same configuration as the above-described first embodiment except for the differences described below. In FIGS. 4 and 5, the same reference numbers are given to the configurations common to the above-described first embodiment.

As shown in FIG. 4, the crown front edge 15 in this embodiment is formed in an arc shape concave toward the toe-side. Similarly, the crown rear edge 16 is formed in an arc shape convex toward the toe side. As a preferred embodiment, the crown front edge 15 and the crown rear edge 16 extend in parallel with each other. Each of the crown blocks 10 configured as such is deformed in its entirety when shearing mud, therefore, it is possible that partial damage of the block is suppressed.

The ground contacting surface of each of the middle blocks 11 in this embodiment includes a substantially rectangular block main body 28 and a convex portion 29 protruding toward the toe-side from the block main body 28. In the middle block 11 configured as such, deformation in the tire circumferential direction of the block is suppressed by the convex portions 29, therefore, it is possible that large reaction force is obtained when the block shears mud.

It is preferred that the convex portion 29 is provided axially outside the center position in the tire axial direction of the ground contacting surface of the middle block 11. More preferably, the convex portion 29 is provided at an outer end in the tire axial direction of the middle block 11, and a part of the convex portion 29 constitutes a part of the middle side edges 23. Thereby, axially inner part of each of the middle blocks 11 is relatively easy to deform, therefore, it is possible that the middle blocks 11 guide mud toward the crown blocks 10 more effectively.

As shown in FIG. 5, the ground contacting surface of each of the crown blocks 10 in this embodiment includes an axially-elongated block main body 31 and a convex portion 32 protruding toward the toe-side from the block main body 31. The convex portion 32 is provided, for example, at the center position in the tire axial direction of the crown block 10. The convex portions 32 configured as such are helpful for suppressing deformation in the tire circumferential direction of the crown blocks 10.

It is preferred that the middle front edge 21 in this embodiment is concave toward the toe-side. Thereby, it is possible that the middle blocks 11 provide larger reaction force in the tire circumferential direction when shearing mud.

Further, it is preferred that the middle rear edge 22 in this embodiment is concave toward the heel-side. Thereby, mud positioned on the toe-side of the middle block 11 is easy to move in the tire axial direction, therefore, it is possible that the motorcycle is easy to lean when running on muddy roads.

In the embodiments of FIGS. 4 and 5, it is preferred that a length W7 in the tire circumferential direction of an outer end in the tire axial direction of each of the middle blocks 11 is larger than a length W8 in the tire circumferential direction of an inner end in the tire axial direction of each of the middle blocks 11.
Thereby, axially inner part of each of the middle blocks 11 is easy to deform, therefore, it is possible that mud is surely guided to the crown blocks 10.

While detailed description has been made of the tire for running on rough terrain as embodiments of the present invention, the present invention can be embodied in various forms without being limited to the illustrated embodiments.

WORKING EXAMPLE (EXAMPLE)

Figure 6:
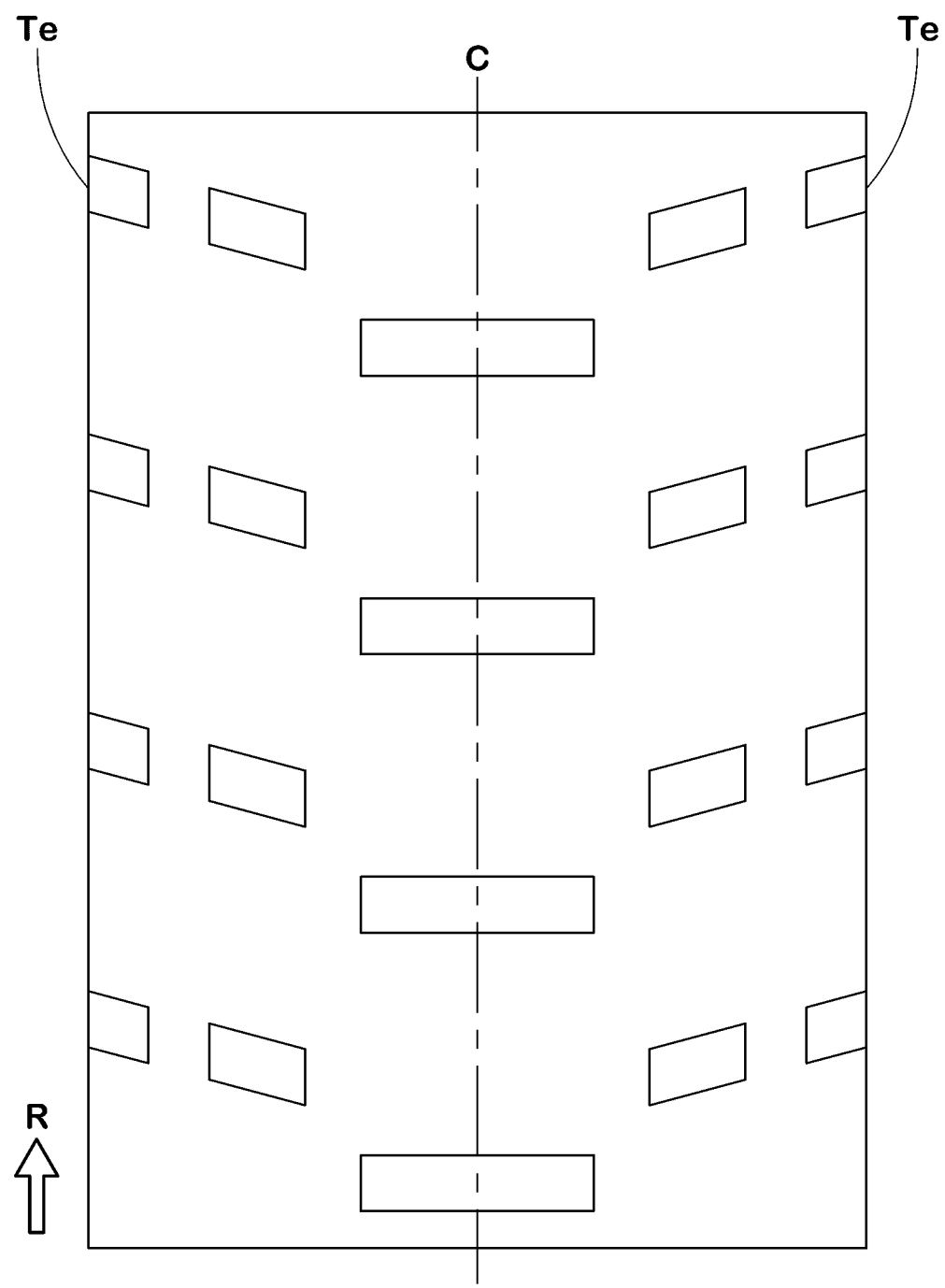
FIG. 6 is a development view of the tread portion of a tire for running on rough terrain according to reference 1.

Tires for running on rough terrain, to be mounted on a rear wheel of a test vehicle, having the basic structure shown in FIG. 2, 4, or 5 were made by way of test according to the specifications listed in Table 1. As reference 1, a tire having the crown front edges extending straight in the tire axial direction as shown in FIG. 6 is made by way of test. Then each of the test tires was tested for the traction performance. Common specifications and test methods of the test tires are as follows.
Test vehicle: motorcycle for motocross competition with displacement of 450 cc
Tire size: 110/90-19
Rim size: 2.15×19
Tire pressure: 80 kPa
Test methods are as follows.
<Traction Performance>
A test rider drove the above-mentioned test vehicle on a soft road surface fully covered with mud containing a lot of water, a medium road surface including mixture of a road surface covered with the above mud and dry rough terrain, and a sandy road surface, and the test driver evaluated the traction performance of each of the test tires by the driver's feeling during the test drive. The results are indicated by an evaluation point based on Reference 1 being 100, wherein the larger the numerical value, the better the traction performance.

Test results are shown in Table 1.

TABLE 1

|  | Ref. 1 | Ref. 2 | Ref. 3 | Ex. 1 | Ex. 2 | Ex. 3 | Ex. 4 | Ex. 5 |
| --- | --- | --- | --- | --- | --- | --- | --- | --- |
| FIG. showing Tread pattern | FIG. 6 | FIG. 2 | FIG. 2 | FIG. 2 | FIG. 2 | FIG. 2 | FIG. 2 | FIG. 2 |
| Angle $\theta 1$ of Inclined edge of Crown block [degrees] | 0 | 5 | 50 | 10 | 15 | 20 | 30 | 45 |
| Angle $\theta 2$ of Middle front edge [degrees] | 15 | 15 | 15 | 15 | 15 | 15 | 15 | 15 |
| Angle $\theta 3$ of Imaginary straight line connecting between Crown block and Middle block | 25 | 25 | 25 | 25 | 25 | 25 | 25 | 25 |
| Axial Gap L3 between Crown block and Middle block/Tread development width (Twe) | 0.07 | 0.07 | 0.07 | 0.07 | 0.07 | 0.07 | 0.07 | 0.07 |
| Circumferential Gap L4 between Crown block and Middle block/Axial Gap L3 | 0.70 | 0.70 | 0.70 | 0.70 | 0.70 | 0.70 | 0.70 | 0.70 |
| Traction performance on soft road surface [evaluation point] | 100 | 102 | 101 | 108 | 109 | 108 | 106 | 105 |
| Traction performance on medium road surface [evaluation point] | 100 | 103 | 103 | 106 | 108 | 108 | 107 | 106 |
| Traction performance on sandy road surface [evaluation point] | 100 | 103 | 102 | 106 | 108 | 107 | 106 | 104 |

|  | Ex. 6 | Ex. 7 | Ex. 8 | Ex. 9 | Ex. 10 | Ex. 11 | Ex. 12 | Ex. 13 |
| --- | --- | --- | --- | --- | --- | --- | --- | --- |
| FIG. showing Tread pattern | FIG. 2 | FIG. 2 | FIG. 2 | FIG. 2 | FIG. 2 | FIG. 2 | FIG. 2 | FIG. 2 |
| Angle $\theta 1$ of Inclined edge of Crown block [degrees] | 15 | 15 | 15 | 15 | 15 | 15 | 15 | 15 |
| Angle $\theta 2$ of Middle front edge [degrees] | 10 | 20 | 30 | 45 | 15 | 15 | 15 | 15 |
| Angle $\theta 3$ of Imaginary straight line connecting between Crown block and Middle block | 25 | 25 | 25 | 25 | 20 | 30 | 40 | 45 |

TABLE 1-continued

|  |  |  |  |  |  |  |  |  |
|---|---|---|---|---|---|---|---|---|
| Axial Gap L3 between Crown block and Middle block/Tread development width (Twe) | 0.07 | 0.07 | 0.07 | 0.07 | 0.07 | 0.07 | 0.07 | 0.07 |
| Circumferential Gap L4 between Crown block and Middle block/Axial Gap L3 | 0.70 | 0.70 | 0.70 | 0.70 | 0.70 | 0.70 | 0.70 | 0.70 |
| Traction performance on soft road surface [evaluation point] | 108 | 109 | 107 | 105 | 108 | 108 | 107 | 106 |
| Traction performance on medium road surface [evaluation point] | 109 | 107 | 106 | 104 | 107 | 108 | 106 | 105 |
| Traction performance on sandy road surface [evaluation point] | 107 | 108 | 107 | 106 | 106 | 107 | 105 | 104 |

|  | Ex. 14 | Ex. 15 | Ex. 16 | Ex. 17 | Ex. 18 | Ex. 19 | Ex. 20 | Ex. 21 |
|---|---|---|---|---|---|---|---|---|
| FIG. showing Tread pattern | FIG. 2 | FIG. 2 | FIG. 2 | FIG. 2 | FIG. 4 | FIG. 4 | FIG. 5 | FIG. 5 |
| Angle θ1 of Inclined edge of Crown block [degrees] | 15 | 15 | 15 | 15 | 10 | 45 | 10 | 45 |
| Angle θ2 of Middle front edge [degrees] | 15 | 15 | 15 | 15 | 15 | 15 | 15 | 15 |
| Angle θ3 of Imaginary straight line connecting between Crown block and Middle block | 25 | 25 | 25 | 25 | 25 | 25 | 25 | 25 |
| Axial Gap L3 between Crown block and Middle block/Tread development width (Twe) | 0.05 | 0.10 | 0.07 | 0.07 | 0.07 | 0.07 | 0.07 | 0.07 |
| Circumferential Gap L4 between Crown block and Middle block/Axial Gap L3 | 0.70 | 0.70 | 0.50 | 1.00 | 0.70 | 0.70 | 0.70 | 0.70 |
| Traction performance on soft road surface [evaluation point] | 109 | 108 | 107 | 108 | 108 | 105 | 109 | 106 |
| Traction performance on medium road surface [evaluation point] | 106 | 108 | 108 | 107 | 107 | 107 | 106 | 105 |
| Traction performance on sandy road surface [evaluation point] | 109 | 107 | 107 | 106 | 105 | 104 | 106 | 104 |

As is clear from Table 1, it was confirmed that the tires as the Examples exerted excellent traction performance on each of the road surfaces.

The invention claimed is:

1. A tire for running on rough terrain comprising:
a tread portion bound with an intended tire rotational direction and comprising
a row of crown blocks arranged on a tire equator and a pair of rows of middle blocks arranged in a tire circumferential direction on both sides of the row of the crown blocks, wherein
each of the crown blocks and the middle blocks has an axially-elongated shape in which a length thereof in a tire axial direction is longer than a length thereof in the tire circumferential direction,
a ground contacting surface of each of the crown blocks has a crown front edge positioned on a heel-side in the tire rotational direction,
the crown front edge comprises:
a concave portion towards the toe-side, said concave portion being the most concave positioned at the most toe-side thereof in the tire rotational direction, and
a pair of inclined edges extending from the most concave portion toward both sides thereof in the tire axial direction and toward the heel-side in the tire rotational direction,
an inclination angle of each of the inclined edges is in a range of from 10 to 45 degrees with respect to the tire axial direction,
a ground contacting surface of each of the middle blocks has a middle front edge positioned on the heel-side in the tire rotational direction,
the middle front edge extends axially outwardly and is inclined to the heel-side,
a width in the tire axial direction of the ground contacting surface of each of the middle blocks is smaller than 50% of a width in the tire axial direction of each of the crown blocks, and
the middle front edge extends linearly over its entire length.

2. The tire for running on rough terrain according to claim 1, wherein
the middle front edge is inclined at an angle in a range of from 10 to 45 degrees with respect to the tire axial direction.

3. The tire for running on rough terrain according to claim 1, wherein
a pair of the crown block and the middle block adjacent to each other in the tire circumferential direction are arranged so that an imaginary straight line obtained by connecting a centroid of the ground contacting surface of the crown block and a centroid of the ground contacting surface of the middle block is inclined at an angle in a range of from 20 to 45 degrees with respect to the tire axial direction.

4. The tire for running on rough terrain according to claim 1, wherein
in a pair of the crown block and the middle block that are closest and adjacent to each other in the tire circumferential direction,
a gap in the tire axial direction between the crown block and the middle block is in a range of from 0.05 to 0.10 times a tread development width, and
a gap in the tire circumferential direction between the crown block and the middle block is in a range of from 0.50 to 1.00 times the gap in the tire axial direction.

5. The tire for running on rough terrain according to claim 1, wherein
a width in the tire axial direction of the ground contacting surface of each of the crown blocks is in a range of from 0.25 to 0.35 times the tread development width, and
a width in the tire axial direction of the ground contacting surface of each of the middle blocks is in a range of from 0.10 to 0.15 times the tread development width.

6. The tire for running on rough terrain according to claim 1, wherein
a ratio of a length in the tire circumferential direction to a width in the tire axial direction of the ground contacting surface of each of the crown blocks is 0.25 or more and 0.45 or less.

7. The tire for running on rough terrain according to claim 1, wherein
a ground contacting surface of each of the crown blocks comprises a first surface disposed on one side of a center position of the ground contacting surface in the tire axial direction and a second surface disposed on the other side of the center position and connected with the first surface, and
each of the first surface and the second surface is formed in an axially-elongated shape in which a width thereof in the tire circumferential direction is constant in a longitudinal direction of the ground contacting surface.

8. The tire for running on rough terrain according to claim 7, wherein
each of the first surface and the second surface is formed in a rectangular shape.

9. The tire for running on rough terrain according to claim 7, wherein
the first surface and the second surface are line-symmetric.

10. The tire for running on rough terrain according to claim 1, wherein the inclined edges are inclined in opposite directions to each other.

11. The tire for running on rough terrain according to claim 10, wherein the inclined edges extend straight from the most concave portion to respective ends in the tire axial direction of the crown front edge so as to form a V-shape that is concave toward the toe-side.

12. The tire for running on rough terrain according to claim 11, wherein a ground contacting surface of each of the crown blocks has a crown rear edge positioned on a toe-side in the tire rotational direction, and the crown rear edge and the crown front edge extend in parallel with each other such that the crown rear edge has a V-shape convex toward the toe-side.

13. The tire for running on rough terrain according to claim 1, wherein an angle of the middle front edge with respect to the tire axial direction is 10 degrees or more and 20 degrees or less.

14. The tire for running on rough terrain according to claim 1, wherein
the ground contacting surface of each of the middle blocks has a middle rear edge positioned on the toe-side in the tire rotational direction, and
the middle rear edge in its entirety extends in parallel with the middle front edge.

15. The tire for running on rough terrain according to claim 1, wherein
the ground contacting surface of each of the middle blocks has an axially inner edge and an axially outer edge,
the axially inner edge and the axially outer edge extend in parallel with the tire circumferential direction, and
a length in the tire circumferential direction of the axially outer edge is larger than a length in the tire circumferential direction of the axially inner edge.

16. A tire for running on rough terrain comprising:
a tread portion bound with an intended tire rotational direction and comprising
a row of crown blocks arranged on a tire equator and a pair of rows of middle blocks arranged in a tire circumferential direction on both sides of the row of the crown blocks, wherein
each of the crown blocks and the middle blocks has an axially-elongated shape in which a length thereof in a tire axial direction is longer than a length thereof in the tire circumferential direction,
a ground contacting surface of each of the crown blocks has a crown front edge positioned on a heel-side in the tire rotational direction,
the crown front edge comprises:
a concave portion towards the toe-side, said concave portion being the most concave positioned at the most toe-side thereof in the tire rotational direction, and
a pair of inclined edges extending from the most concave portion toward both sides thereof in the tire axial direction and toward the heel-side in the tire rotational direction,
an inclination angle of each of the inclined edges is in a range of from 10 to 45 degrees with respect to the tire axial direction,
a ground contacting surface of each of the middle blocks has a middle front edge positioned on the heel-side in the tire rotational direction,
the middle front edge extends axially outwardly and is inclined to the heel-side, and
a width in the tire axial direction of the ground contacting surface of each of the middle blocks is smaller than 50% of a width in the tire axial direction of each of the crown blocks wherein
the ground contacting surface of each of the middle blocks comprises a rectangular block main body and a convex portion protruding toward the toe-side and extending in parallel with the tire circumferential direction from the block main body.

17. The tire for running on rough terrain according to claim 16, wherein
the convex portion is provided axially outside a center position in the tire axial direction of the ground contacting surface of the middle block.

18. The tire for running on rough terrain according to claim 17, wherein
the convex portion is provided at an outer end in the tire axial direction of the middle block such that a part of the convex portion constitutes a part of a middle side edge of the middle block.

19. A tire for running on rough terrain comprising:
a tread portion bound with an intended tire rotational direction and comprising
a row of crown blocks arranged on a tire equator and a pair of rows of middle blocks arranged in a tire circumferential direction on both sides of the row of the crown blocks, wherein
each of the crown blocks and the middle blocks has an axially-elongated shape in which a length thereof in a tire axial direction is longer than a length thereof in the tire circumferential direction,
a ground contacting surface of each of the crown blocks has a crown front edge positioned on a heel-side in the tire rotational direction,
the crown front edge comprises:
  a concave portion towards the toe-side, said concave portion being the most concave positioned at the most toe-side thereof in the tire rotational direction, and
  a pair of inclined edges extending from the most concave portion toward both sides thereof in the tire axial direction and toward the heel-side in the tire rotational direction,
an inclination angle of each of the inclined edges is in a range of from 10 to 45 degrees with respect to the tire axial direction,
a ground contacting surface of each of the middle blocks has a middle front edge positioned on the heel-side in the tire rotational direction and a middle rear edge positioned on the toe-side in the tire rotational direction, and
the middle front edge extends axially outwardly and is inclined to the heel-side, and
a width in the tire axial direction of the ground contacting surface of each of the middle blocks is smaller than 50% of a width in the tire axial direction of each of the crown blocks, wherein
the middle rear edge is concave toward the heel-side in an arc shape over its entire length,
the middle front edge is concave toward the toe-side in an arc shape over its entire length,
the middle front edge and the middle rear edge are closer to each other at an axially center portion than axially end portions of the ground contacting surface,
each of the middle blocks has a middle front side surface extending from the middle front edge all the way to a tread bottom and a middle rear side surface extending from the middle rear edge all the way to the tread bottom,
in a tread development view, the entire middle front side surface is concave toward the toe-side in an arc shape over its entire length, and
the entire middle rear side surface is concave toward the heel-side in an arc shape over its entire length.

* * * * *